April 3, 1956  P. F. BORTH ET AL  2,740,323
COLOR SEPARATION APPARATUS
Filed July 22, 1952  2 Sheets-Sheet 1

INVENTORS:
PAUL F. BORTH
JOSEPH J. PETERKA
CHARLES E. WILSON, JR.
BY: *Schroeder, Merriam, Hofgren & Brady*
ATTORNEYS:

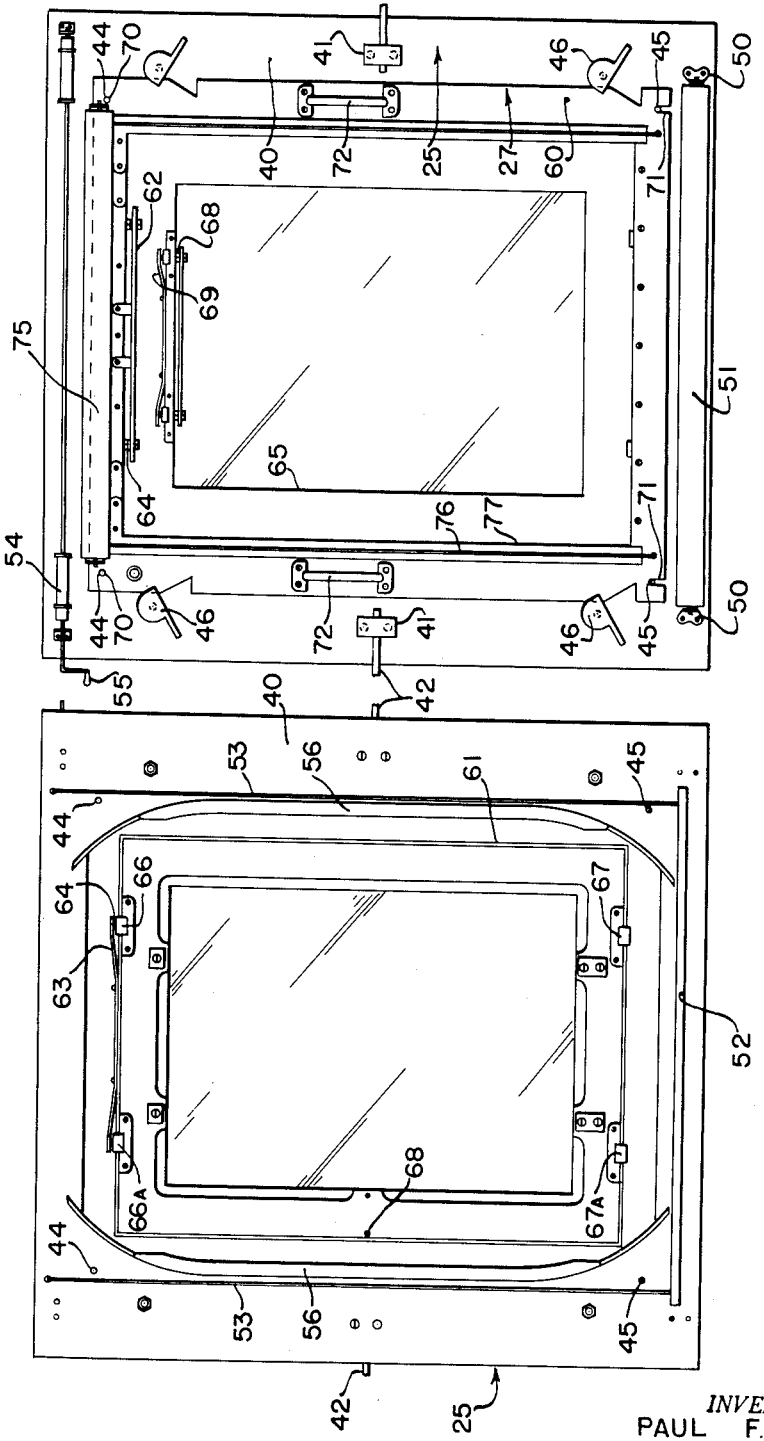

United States Patent Office 2,740,323
Patented Apr. 3, 1956

2,740,323
COLOR SEPARATION APPARATUS

Paul F. Borth, Park Forest, Joseph J. Peterka, Berwyn, and Charles E. Wilson, Jr., Park Ridge, Ill., assignors to R. R. Donnelley & Sons Company, a corporation of Illinois Application July 22, 1952, Serial No. 300,226

5 Claims. (Cl. 88—24)

This invention relates to a photographic process for producing color separation negatives usable in halftone printing processes together with apparatus adapted for carrying out such methods.

It is the general object of this invention to produce methods and apparatus for preparing a halftone negative by a direct separation process.

A great number of difficulties are encountered when attempting to reproduce, by printing methods, colored copy, such as Kodachrome transparencies and the like. The deficiencies of the direct color separation process are well known in the art and it is recognized in the graphic arts that the simple preparation of separation negatives by photographing the copy through red, green and blue filters and subsequently printing from halftone plates made from the color separation negatives so obtained will not truly reproduce the copy. Due to the absorption and transmission characteristics of the filters used and to the response of photographic plates to various parts of the spectrum transmitted by the filters, conventional uncorrected color separation negatives will have a number of errors. The negative which is to be used for making the halftone printing plate is known in the art as a "printer." Thus the color separation negative to be used, for example, in making the plate which is to print the yellows, is known as the "yellow printer" and accordingly such terminology will be employed herein. The green filter separation negative (the magenta printer), if uncorrected, will record an excess of color wherever there is a blue component in the copy; the blue filter separation negative (the yellow printer) will record an excess of color wherever there is either a magenta or a cyan component. Wherever a printing plate to print the blacks is to be used, there is no straight photographic method which will isolate the neutral shades such as the whites, greys and blacks inasmuch as browns and light greens have a grey component.

In addition to the difficulties encountered in producing the color separation negatives, the inks to be used for the final printing also have deficiencies. The cyan or blue ink should reflect 100% of the blue and green light and no red but actually blue inks reflect only 50% to 60% of the green and blue light and reflect 30% to 40% of red. The magenta ink should reflect 100% of the red and blue and no green but actually most magenta inks reflect about 75% of the red, 60% of the blue and 25% of the green. Yellow inks for the most part are good.

The preceding fundamental difficulties of the direct color separation method can be corrected on the printing plates by a manual and rather tedious procedure of etching the plates. In halftone printing, this involves changing the sizes of the metal dots by mechanical or chemical means so as to increase or decrease the intensity of printing of any particular color of ink in a particular area. The making of such corrections is a fine art and involves considerable skill, time and expense.

A further method of correcting the difficulties above mentioned is by the use of the process known as masking. The basic principle of masking, which is an indirect method of producing a halftone negative, involves the use of a mask which is a photographic image of the copy made by photographing the copy through a green filter or red filter and then interposing such masks between the copy and a color separation plate. Thus, for example, in making the magenta printer by the direct color separation method wherein the copy is photographed through a green filter, since such negative will reproduce an excess of color wherever there is a magenta component (because the green filter is too transparent to magenta) a comparatively light positive made by exposing a plate to the copy through a red filter is registered with the plate to become the magenta printer and the mask increases the density of areas in the final negative representing the blue areas in the copy or original. Consequently the excess values of the magenta over the rest of the plate will be reduced. After the exposure of the plate, a halftone negative must then be produced by the use of a halftone screen. After the halftone negative has been prepared, manual correction of the halftone print made therefrom is usually still necessary; although less manual labor is required where the masking process was used as compared to the previously described direct color separation method.

According to this invention, however, it is possible to produce halftone color separation negatives directly, which negatives need little or no hand correction thereafter in order correctly to reproduce the true colors of the copy or original to be reproduced.

In the process of this invention an unsharp mask is prepared by exposing a photographic emulsion to an out of focus optical image of the copy through suitably filtered light. For the magenta printer a red filter is used to produce a mask which is also usable with a printer which is to print the blacks. A blue filter is used for the cyan printer while a green filter is used for the yellow printer. In preparing the final printer, the appropriate mask is placed in the same position in the camera it occupied when it was originally exposed and an unexposed plate is placed in the focal plane of the camera. A halftone screen is interposed between the mask and the plate and the plate is then exposed, using an appropriate filter, directly to produce a color separation negative.

A summary of the filters used in preparing the mask and in making the final printer is set forth below.

| Printer | Filter Used in Producing Mask | Filter Used in Exposing through the Mask the plate to Become the Color Separation Negative | Filter Used in Final Exposing of Plate |
|---|---|---|---|
| Magenta | Red | Green or Blue | Green. |
| Cyan | Blue | Red | Red. |
| Yellow | Green | Blue or Red | Blue. |
| Black | Red | Green and/or Blue | Red. |

Details of carrying out the process and apparatus suitable for use therewith will hereinafter be more fully set forth in conjunction with the following drawings, in which:

Fig. 3 is a side elevational view of a register plate and mask holder usable with the camera; and Fig. 4 is a view like Fig. 3 taken from the opposite end thereof.

Figure 2:
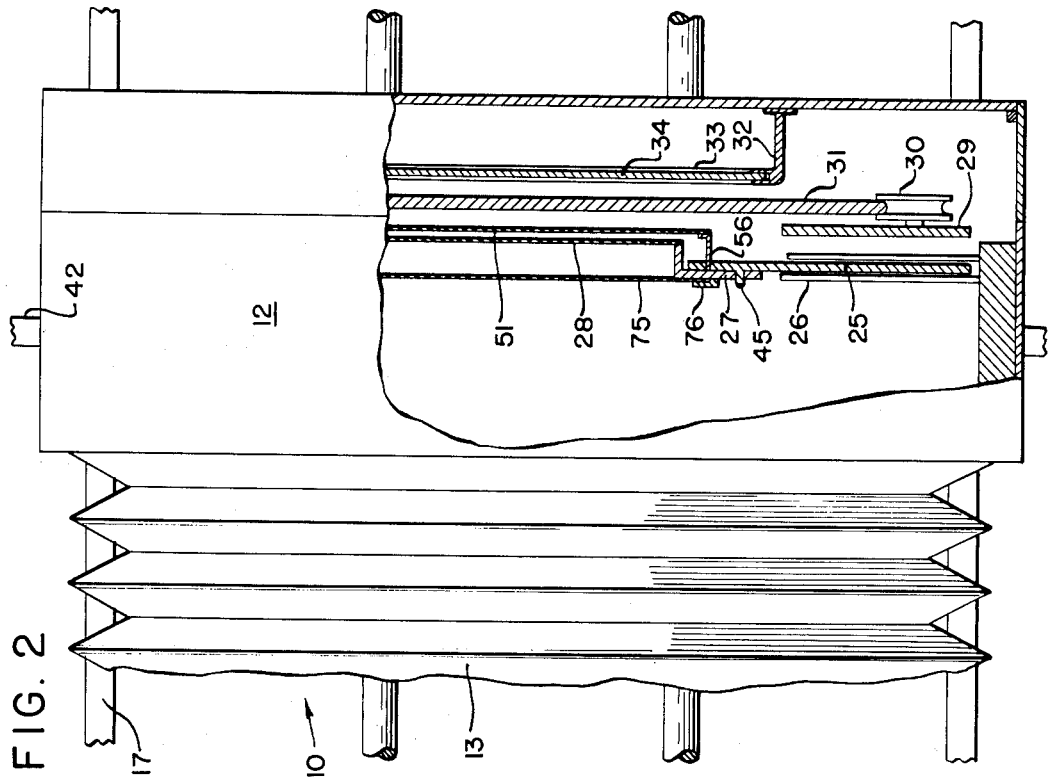
Fig. 2 is an enlarged detailed view somewhat diagrammatic in character of the lower right-hand corner of the camera shown in Fig. 1 and partially broken away to illustrate the parts thereof within the camera case.

While this invention is susceptible of embodiments in many different forms, there is shown in the drawings and will herein be described in detail one specific method and apparatus, with the understanding that the present disclosure is to be considered as an exemplification of the principles of the invention and is not intended to limit the invention to the embodiment illustrated. The scope of the invention will be pointed out in the appended claims.

Figure 1:
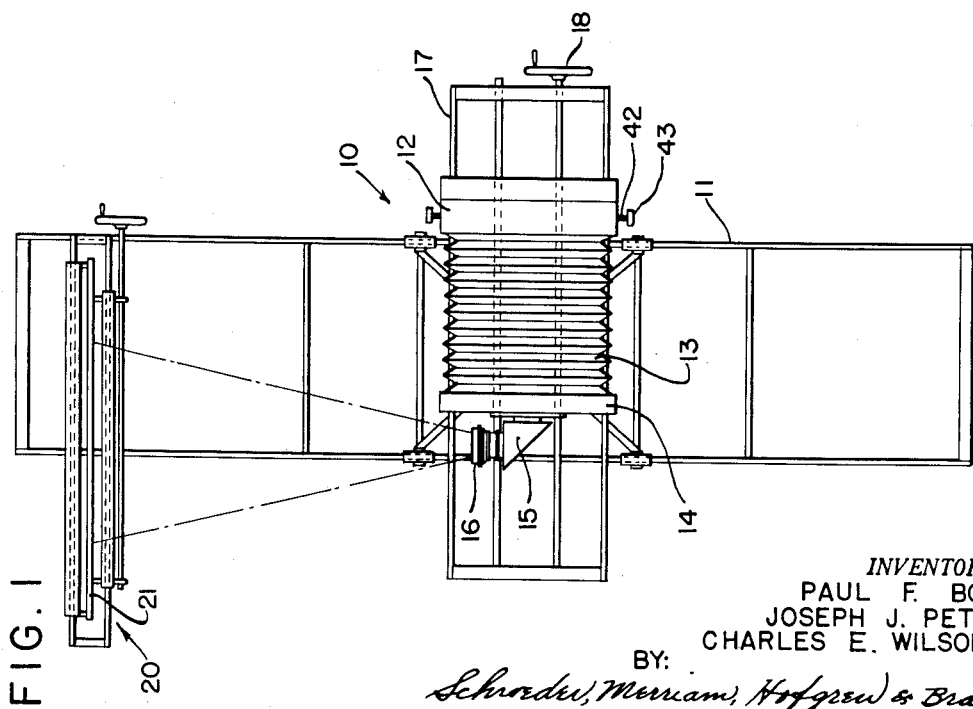
Fig. 1 is a top plan view of a camera embodying the invention and usable with the process hereof.

Referring now to Figs. 1 and 2 of the drawings, there is shown a camera generally designated 10 slidably mounted on a track 11 with the camera being provided with a back plate 12, a bellows 13 and a front plate 14 which supports a right angle prism 15 and lens 16. The camera back is slidable transversely of the track 11 on bed 17 and may be moved thereon by the handwheel 18 in order properly to focus the image.

A copy board 20 of usual construction carries the copy 21 which is to be reproduced and suitable adjustments are provided for moving the copy and its supporting board in a manner well known in the art.

Referring now specifically to Fig. 2 there is mounted within the back plate of the camera a register plate 25 slidably supported on brass channels 26 positioned at the top and bottom of the register plate, which plate is adapted to support a mask holder 27 having a mask 28 therein. A halftone screen holder 29 is provided with rollers 30 for supporting a halftone screen 31 constructed in the usual manner with the screen being interposed between the mask and a plate holder 32 provided with channels 33 for supporting a photographic plate 34.

Referring now to Figs. 3 and 4, the register plate 25 comprises an apertured aluminum plate 40 preferably of the thickness of about ¼ inch to which is secured a pair of threaded blocks 41 threadedly supporting adjustment shafts 42 which extend outwardly of the camera back and each of which is provided with knobs 43 so that by rotation of the knobs the register plate may be moved laterally slightly within its supporting channels so as to provide for proper register of a mask therein with the image formed on the plate.

The register plate is provided with a pair of pins 44 adjacent its top and a second pair of pins 45 adjacent its bottom so that the mask holder 27 may accurately be positioned thereon and may be removed and returned with the assurance that it will be returned to the same position it previously occupied. Cam locks 46 are provided on the register plate and are adapted to overlie the edges of the mask holder 27 to hold the same securely in position on the register plate.

Mounted on the bottom of the register plate is a pair of brackets 50 rotatably supporting a roller shade 51 which extends through a slot 52 formed in the register plate. For operating the window shade there is provided a pair of strings 53, one attached to each side of the roller, which strings extend upwardly on the back side of the register plate and through suitable openings for attachment to a windlass 54 which can be operated by a crank handle 55 positioned exteriorly of the camera. Thus by operating the crank handle 55 the shade 51 can be unrolled through the slot 52 so that it extends across the opposite side, that is the back side, of the register plate to mask light from that side. To aid in guiding the roller shade a pair of spaced guides 56 are provide on the back side of the register plate.

The mask holder 27 is adapted to be removably secured in the register plate and comprises an apertured aluminum plate 60 having a stepped edge 61 therein proportioned to receive the ordinary 14" by 17" photographic plate. If a plate of this size is being used the same may be placed in position in the stepped edge and held therein by spring pressure. For this purpose there is provided a pair of clips 66 and 66a adapted to bear against the plate under the urging of a spring 63 which presses against rods 64 slidably mounted in the register plate and carrying the clips. A bar 62 is secured to the rods 64 on the other side of the plate. The holder is provided with two fixed clips 67 and 67a at the bottom of the holder. In placing a mask in the holder the lower edge thereof is placed in the grooves formed in the lower clips 67 and 67a and the masking plate is slid sideways to bring its side edge into contact with a fixed pin 68 at the left of the mask opening. The upper edge of the mask is engaged by the spring urged clips 66 and 66a. In removing the mask, the bar 62 may be pressed upwardly to free the clips 66 and 66a.

If it is desired to use a smaller mask, such as an 11" by 14" mask, a mask holder such as the one 65 may be provided, with the latter having the outside dimensions 14" by 17" so that it may be held in the stepped edge 61 in lieu of a larger plate. The insert plate 65 is provided with a stepped edge for holding an 11" by 14" plate and also with suitable means for retaining a mask therein including clips, rods 68, spring 69 and bar arrangement similar to the retaining means on the mask holder as previously described.

The top of the plate 60 is provided with a pair of holes 70 adapted to receive the pins 44 and at its bottom with a pair of slots 71 to receive the pins 45. A pair of handles 72 on the front side of the mask holder permit ease of handling when the same is placed in position on the register plate. The mask holder carries a roller shade 75 operable by strings 76 which extend downwardly therefrom and through suitable openings at the bottom of the mask holder so that they may be reached from the back side of the mask holder and operated to draw the shade 75 over suitable guides 77 and across the front face of the mask holder.

In operating the apparatus to carry out the methods of the invention, a plain glass plate having the same optical properties as the glass plate of which the mask is to be made is placed in the mask holder and the same is placed on the register plate. Inasmuch as the mask holder is secured to the front side of the register plate the bellows must be removed for this operation and for subsequent operations where the mask holder is either replaced or removed. With the plain glass plate and the halftone screen in place the image of the copy is focused on a ground glass screen positioned in the plate holder. The mask holder is then removed and loaded in the dark room with a light sensitive photographic plate. Preferably the plate is one having a high contrast emulsion, for example Kodak CTC Panchromatic, and the plate is protected from light by closing the curtain 75 on the front of the mask holder and covering the back of the mask holder with a temporary cover of metal or the like.

The mask holder is then returned to the camera and positioned on the register plate as previously described. Using a suitable filter as determined by the table hereinbefore set forth, the mask plate is exposed to the copy and during this exposure, of course, the curtain 75 is raised by the strings 76. After the exposure the curtain is again lowered over the front of the mask holder, the bellows are opened and the mask holder is removed to the dark room where the plate is developed, preferably using a high contrast developer. This procedure is followed for the preparation of each of the masks required, using in each case the filter specified. In making the final printer, that is in making the color separation halftone negative to be used in making the printing plate, the proper mask is inserted in the mask holder and the same is replaced on the register plate within the camera. The pins and slot arrangement for positioning the mask holder on the register plate assure that the mask will resume the same, or very close to the same, position it occupied when it was first exposed. When the mask is inserted it is preferable to reinsert the ground glass screen in order to check the registry of the silver negative mask image with the optical image formed by the lens, and if the mask is slightly out of register adjustment may be made by means of the knobs 43. When the image is in register, the ground glass is removed and replaced with a plate holder carrying an unexposed plate. With the appropriate filter inserted in the lens a suitable exposure is made through the mask. When the plate is partially exposed the curtain 51 on the register plate is closed using the crank 55 at the side of the camera. The bellows is then removed and the mask holder removed from the register plate, during which operation of course the shade 51 protects the partially exposed plate from light. The mask is replaced by a clear glass plate having the same optical properties as the plate forming the mask and the mask holder is then returned to position and the bellows replaced. The curtain 51 is then opened and the exposure of the plate is completed, changing the filter for the final exposure where indicated.

The filters and the emulsions used in the process are well known in the art and need not be detailed here. The proper exposure can be judged by competent operators, with the exposures of course varying with the subject to be reproduced. The density of the mask is not too important as it will be noted that only part of the exposure of the final plate is made through the mask and thus when the mask is slightly overdense the exposure therethrough can be a little longer. It is believed apparent that the reasons for utilizing a clear glass plate whenever the mask is not being used is to assure that the same optical system exists between the copy and the final plate at all stages of the process.

It will be noted from the foregoing that the final plate is a halftone plate inasmuch as a halftone screen was interposed between it and the mask during the entire period of its exposure and that in the resulting printer plate compensation is made for the deficiencies in the photographic process and in the printing inks to be used.

We claim:

1. Apparatus for supporting a mask in a camera comprising a register plate having an aperture therein, means for securing the register plate in fixed position in the camera, a mask holder having a substantially rectangular aperture therein, a pair of guide channels at the bottom of the aperture in the mask holder, a stop at one side of the last mentioned aperture, resilient means at the top of the last mentioned aperture whereby one edge of a mask may be inserted in said channels and moved against said stop and held in the fixed position so determined by said resilient means, fixed interengaging indices on the register plate and mask holder to guide the mask holder to a predetermined position over said aperture on the register plate, and a pair of roller shutters one on the register plate and operable from outside of the camera to cover the backside of said plate and one on the mask holder and operable from the backside of the register plate to cover the front side of said holder.

2. Apparatus for supporting a mask in a camera comprising a register plate having a substantially rectangular aperture therein, means for securing the register plate in fixed position in the camera, a mask holder, means on the mask holder for guiding a mask to a predetermined position thereon, a plurality of pins on the register plate positioned adjacent and around the aperture therein, two of said pins being adjacent the bottom of said aperture and two adjacent the top, there being two holes in the mask holder adjacent the top thereof and two open ended slots in said mask holder adjacent the bottom thereof, with said holes and slots being positioned to engage said pins to guide the mask holder to a predetermined position over said aperture on the register plate, and a pair of movable shutters one operable to cover the backside of said plate and the other operable to cover the front side of said mask holder.

3. Apparatus for supporting a mask in a camera comprising a register plate having a substantially rectangular aperture therein, means for securing the register plate in fixed position in the camera, means operable exteriorly of the camera for adjusting the register plate in the camera, a mask holder having a substantially rectangular aperture therein, a pair of guide channels at the bottom of the aperture in the mask holder, a stop at one side of the last mentioned aperture, resilient means at the top of the last mentioned aperture whereby one edge of a mask may be inserted in said channels and moved against said stop and held in the fixed position so determined by said resilient means, a plurality of pins on the register plate positioned adjacent and around the aperture therein, two of said pins being adjacent the bottom of said aperture and two adjacent the top, there being two holes in the mask holder adjacent the top thereof and two open ended slots in said mask holder adjacent the bottom thereof, with said holes and slots being positioned to engage said pins to guide the mask holder to a predetermined position over said aperture on the register plate, and a pair of roller shutters one on the register plate and operable from outside of the camera to cover the backside of said plate and one on the mask holder and operable from the backside of the register plate to cover the front side of said holder.

4. Apparatus for supporting a mask in a camera comprising a register plate having an aperture therein, means for securing the register plate in fixed position in the camera, a mask holder having a substantially rectangular aperture therein, a pair of guide channels at the bottom of the aperture in the mask holder, a stop at one side of the last mentioned aperture, resilient means at the top of the last mentioned aperture whereby one edge of a mask may be inserted in said channels and moved against said stop and held in the fixed position so determined by said resilient means, fixed interengaging indices on the register plate and mask holder to guide the mask holder to a predetermined position over said aperture on the register plate, and a pair of movable shutters, one operable to cover the back side of said plate and the other operable to cover the front side of said mask holder.

5. Apparatus for supporting a mask in a camera comprising a register plate having an aperture therein, means for securing the register plate in fixed position in the camera, a mask holder having an aperture therein, means on the mask holder for guiding a mask to a predetermined position thereon, fixed interengaging indices on the register plate and mask holder to guide the mask holder to a predetermined position over said aperture on the register plate, and a pair of movable shutters, one operable to cover the back side of said plate and the other operable to cover the front side of said mask holder.

References Cited in the file of this patent

UNITED STATES PATENTS

| | | |
|---|---|---|
| 1,347,824 | Pifer | July 27, 1920 |
| 1,373,020 | Raschke | Mar. 29, 1921 |
| 1,576,118 | Hahn | Mar. 9, 1926 |
| 2,142,437 | Eaton | Jan. 3, 1939 |
| 2,420,636 | Yule | May 13, 1947 |
| 2,523,735 | Sussin | Sept. 26, 1950 |
| 2,564,934 | Sussin | Aug. 21, 1951 |

OTHER REFERENCES

Preucil: "Masking of Color Correction," page 13, published by The Nation Lithographer, New York, 1948.

A Kodak Graphic Arts Data Book, "Masking Color Transparencies for Photomechanical Reproduction," 44 pages, published by Eastman Kodak Company, 1951.